United States Patent
Hasegawa

(10) Patent No.: US 9,196,392 B2
(45) Date of Patent: Nov. 24, 2015

(54) ASSEMBLY CONDUCTING WIRE FOR ROTARY ELECTRIC MACHINE WINDING AND ROTARY ELECTRIC MACHINE

(71) Applicant: Ayako Hasegawa, Nagoya (JP)

(72) Inventor: Ayako Hasegawa, Nagoya (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 155 days.

(21) Appl. No.: 14/150,071

(22) Filed: Jan. 8, 2014

(65) Prior Publication Data

US 2014/0197709 A1   Jul. 17, 2014

(30) Foreign Application Priority Data

Jan. 11, 2013   (JP) .................................. 2013-003796

(51) Int. Cl.
*H02K 1/00*    (2006.01)
*H01B 5/08*    (2006.01)
*H02K 3/14*    (2006.01)

(52) U.S. Cl.
CPC ... *H01B 5/08* (2013.01); *H02K 3/14* (2013.01)

(58) Field of Classification Search
CPC ............. H02K 3/12; H02K 3/14; H02K 3/18; H02K 3/28
USPC ......................................................... 310/179
See application file for complete search history.

(56) References Cited

U.S. PATENT DOCUMENTS

| | | | |
|---|---|---|---|
| 2,821,641 A | | 4/1956 | Ringland |
| 3,283,280 A | * | 11/1966 | Fischer ......................... 336/187 |
| 2002/0047443 A1 | * | 4/2002 | Heyden et al. ................ 310/179 |
| 2002/0050395 A1 | * | 5/2002 | Kusumoto et al. ......... 174/128.2 |
| 2005/0110357 A1 | | 5/2005 | Fukasaku et al. |
| 2006/0071573 A1 | * | 4/2006 | Fujita et al. .................... 310/216 |
| 2009/0127966 A1 | * | 5/2009 | Saari et al. ..................... 310/213 |

FOREIGN PATENT DOCUMENTS

| | | |
|---|---|---|
| JP | 2005-124362 A | 5/2005 |
| JP | 2009-199749 A | 9/2009 |
| JP | 2014033500 A | 2/2014 |
| WO | 2014020397 A2 | 2/2014 |

* cited by examiner

*Primary Examiner* — Hanh Nguyen
(74) *Attorney, Agent, or Firm* — Kenyon & Kenyon LLP

(57) ABSTRACT

An assembly conducting wire for a rotary electric machine winding includes a plurality of bundled wires, the plurality of wires being twisted in a circumferential direction of the assembly conducting wire, and the plurality of wires being welded together at a predetermined distance.

4 Claims, 6 Drawing Sheets

180 DEGREE
DISLOCATION 4 TIMES

180 DEGREE
DISLOCATION 4.5 TIMES

ASSEMBLY CONDUCTING WIRE FOR ROTARY ELECTRIC MACHINE WINDING AND ROTARY ELECTRIC MACHINE

INCORPORATION BY REFERENCE

The disclosure of Japanese Patent Application No. 2013-003796 filed on Jan. 11, 2013 including the specification, drawings and abstract is incorporated herein by reference in its entirety.

BACKGROUND OF THE INVENTION

1. Field of the Invention

The invention relates to an assembly conducting wire for a rotary electric machine winding formed by a plurality of wires bundled together, and a rotary electric machine.

2. Description of Related Art

Japanese Patent Application Publication No. 2009-199749 (JP 2009-199749 A), for example, describes the manufacturing of an assembly conducting wire by first forming a strand wire by twisting a plurality of wires each coated with an insulating layer, and in this state, compression molding a cross section of the strand wire into a predetermined shape by forming using a forming die, and then coating the surface of the strand wire with an insulating layer that is thicker than the insulating layer of each of the wires.

SUMMARY OF THE INVENTION

When bending the assembly conducting wire described in JP 2009-199749 A in order to wind it (i.e., the assembly conducting wire) as a stator coil for a rotary electric machine, the bending curvature is large, so the wires that form the strand wire may come apart and the outermost insulating layer may consequently fracture.

When metal material is used as the coating of the outer layer in order to strengthen the banding of the strand wire, an eddy current will be generated in the metal material layer, and this eddy current will become a circulating current which will increase loss when it flows, which is problematic.

On the other hand, when the wires that form the assembly conducting wire are joined together by being welded in suitable locations, a short via the welding location may lengthen the path of the circulating current that flows through the wires and lead to an increase in loss.

The invention thus provides an assembly conducting wire for a rotary electric machine winding, which is capable of both inhibiting a circulating current from being generated as a result of wires being welded together, and inhibiting the wires from coming apart.

A first aspect of the invention relates to an assembly conducting wire for a rotary electric machine winding. This assembly conducting wire includes a plurality of bundled wires. The plurality of wires are twisted in a circumferential direction of the assembly conducting wire. The plurality of wires are welded together at a predetermined distance. In the assembly conducting wire, the predetermined distance may be a distance at which the plurality of wires are twisted 180 degrees in the circumferential direction of the assembly conducting wire. In the assembly conducting wire, the predetermined distance may be a distance at which the plurality of wires are twisted 360 degrees in the circumferential direction of the assembly conducting wire.

A second aspect of the invention relates to a rotary electric machine that includes a stator, a rotor, and an assembly conducting wire including a plurality of bundled wires. The plurality of wires are twisted in a circumferential direction of the assembly conducting wire. The plurality of wires are welded together at a predetermined distance. The assembly conducting wire is wound around the stator or the rotor such that a welded portion of the assembly conducting wire is positioned inside of a slot of a stator core of the stator or a slot of a rotor core of the rotor.

The assembly conducting wire for a rotary electric machine winding according to the invention is able to inhibit a circulating current from being generated as a result of wires being welded together, and inhibit the wires from coming apart.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, example embodiments of the invention (hereinafter simply referred to as "example embodiments") will be described in detail with reference to the accompanying drawings. In the description, the specific shapes, materials, numeric values, and directions and the like are merely examples to facilitate understanding of the invention, and may be changed as appropriate according to the use, objective, and specifications and the like. Also, when the description includes a plurality of example embodiment or modified examples or the like, the use of the characteristic portions thereof in appropriate combinations is initially intended.

Figure 1:
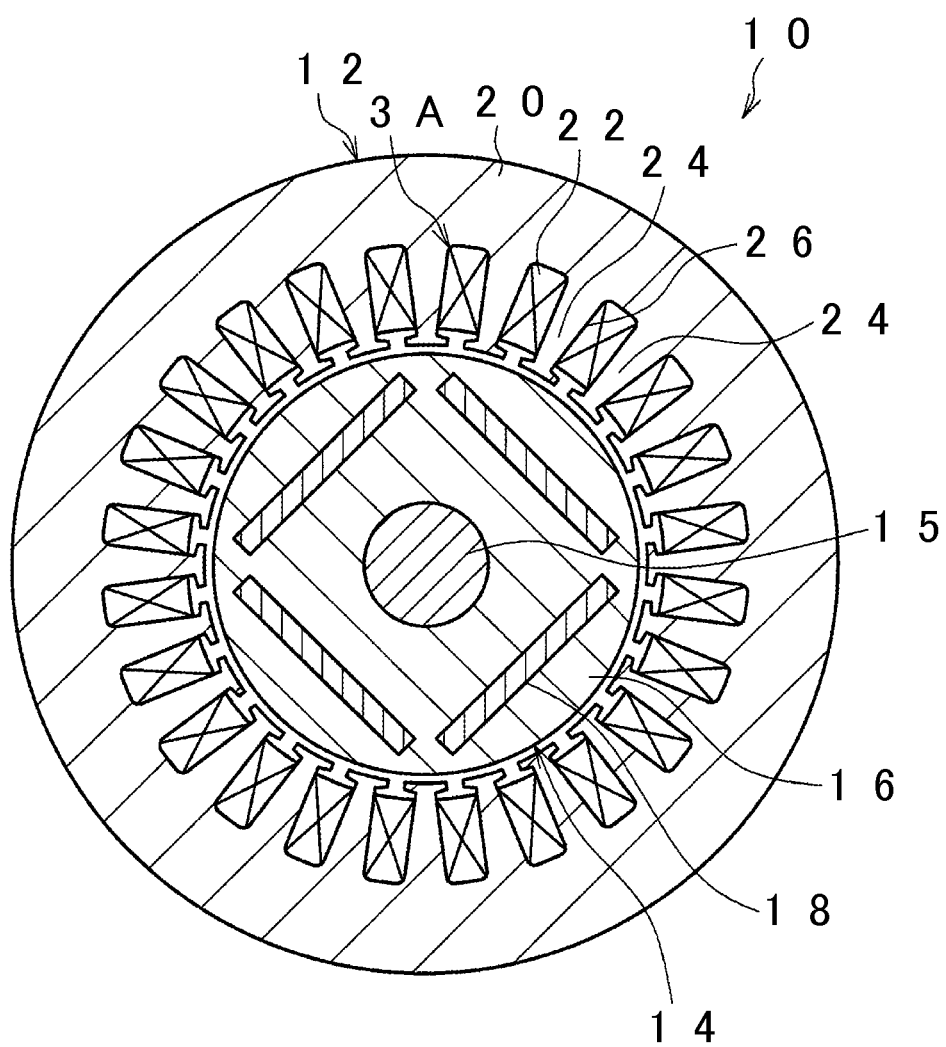
FIG. 1 is a sectional view orthogonal to an axial direction of a rotary electric machine into which the assembly conducting wire of the invention is incorporated.
Figure 2:
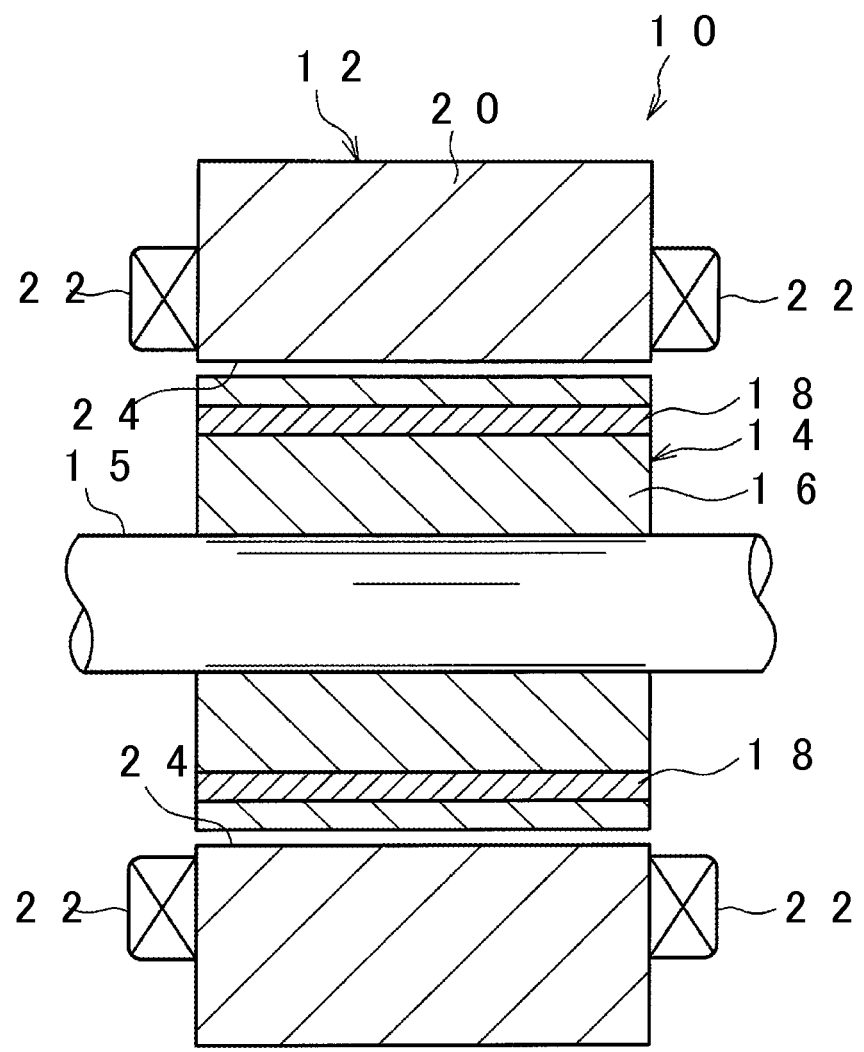
FIG. 2 is an axial sectional view of the rotary electric machine shown in FIG. 1.

FIG. 1 is a sectional view orthogonal to an axial direction of a rotary electric machine to which the assembly conducting wire for a rotary electric machine winding that is one example embodiment of the invention is applied. FIG. 2 is a sectional view taken along the axial direction of the rotary electric machine shown in FIG. 1.

A rotary electric machine 10 according to the example embodiment includes a generally cylindrical stator 12 that is fixed inside of a case, not shown, and a rotor 14 that can rotate relative to the stator 12. In the example shown in FIGS. 1 and 2, the stator 12 and the rotor 14 are arranged face-to-face across a predetermined small gap, in a radial direction orthogonal to the axial direction of the rotary electric machine 10. The rotor 14 is arranged on an inner peripheral side of the stator 12.

The rotor 14 includes a shaft 15 is that is rotatably supported, a rotor core 16 that is fixed to an outer peripheral surface of the shaft 15, and a plurality of permanent magnets 18 that are arranged in the rotor core 16 in the circumferential direction thereof.

The stator 12 includes a stator core 20, and a coil 22 of a plurality of phases (such as three phases) arranged on the stator core 20. A plurality of teeth 24 that protrude radially inward toward the rotor 14 are arranged on the stator core 20 at intervals (i.e., equidistant intervals) in the circumferential direction around the axial direction. Slots 26 are formed extending along in the axial direction between the teeth 24 that are adjacent in the circumferential direction.

In the example shown in FIGS. 1 and 2, the direction in which the plurality of teeth 24 protrude matches the radial direction, the direction in which the plurality of teeth 24 are arranged matches the circumferential direction, and the direction in which the plurality of teeth 24 extend matches the axial direction. Magnetic poles are formed on the stator 12 by the coil 22 being wound by a winding method such as a distributed winding, for example, around the teeth 24 through the slots 26 between the teeth 24.

Figure 3:
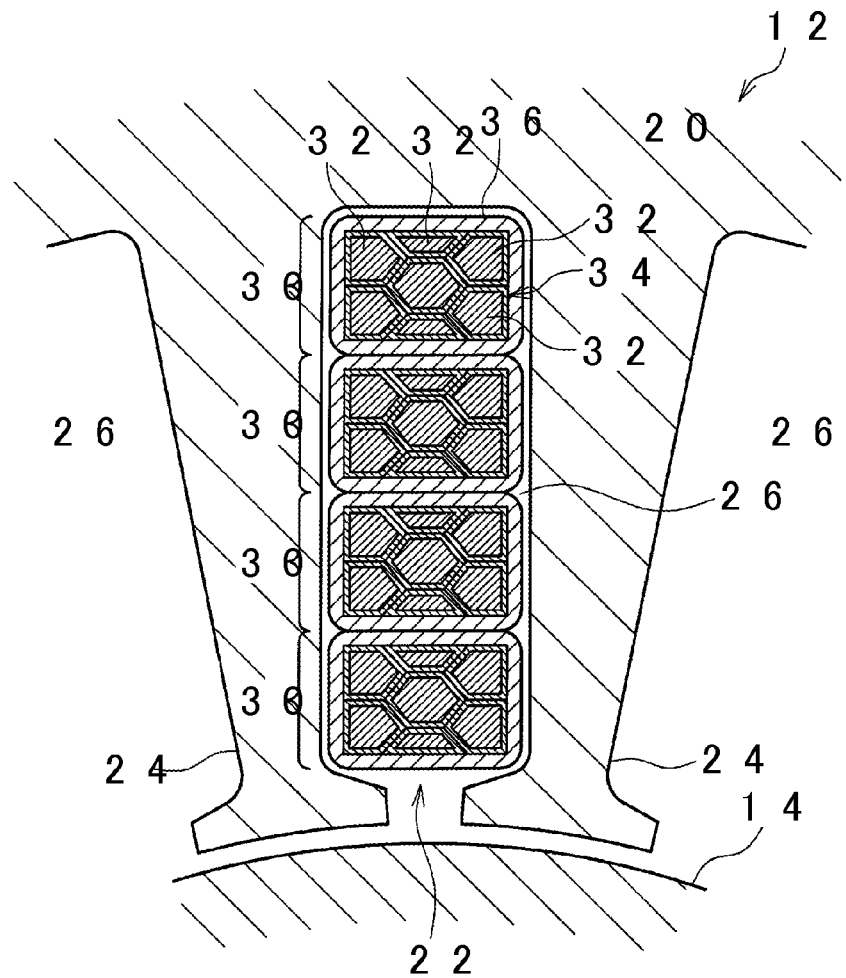
FIG. 3 is an enlarged view of a portion 3A in FIG. 1.

FIG. 3 is an enlarged view of portion 3A in FIG. 1. FIG. 3 shows the manner in which an assembly conducting wire 30 that forms the coil 22 is arranged in one slot 26. The assembly conducting wire in the slots on both sides in the circumferential direction is omitted in the drawing.

As shown in FIG. 3, a plurality (four in this example embodiment) of the assembly conducting wires 30 are arranged lined up in the radial direction inside the slot 26. The assembly conducting wires 30 are housed in the slot 26 closely contacting one another. Insulating paper, not shown, is interposed between an inside wall surface of the slot 26 and the assembly conducting wires 30, such that the coil 22 is insulated from the stator core 20.

Each assembly conducting wire 30 is formed as a strand wire in which a wire assembly 34 formed by a plurality (seven in this example embodiment) of wires 32, each of which is insulation coated, that have been bundled together are twisted in the circumferential direction of the assembly conducting wire 30. An insulating layer 36 is formed on the surface of the wire assembly 34. In this example embodiment, an example is given in which the wire assembly 34 is formed by seven of the wires 32, but the number of wires 32 may be changed as appropriate.

The wires 32 may be any well-known wire. For example, the wires 32 may be made of copper, aluminum, silver, gold, or an alloy of these, or the like. Also, the number of wires 32 that form the wire assembly 34 may be changed as appropriate. Also, the sectional shape of the wires 32 may be any shape, such as round, square, or hexagonal, or the like, and the diameter of the conducting wire thereof may also be changed as appropriate.

The insulating material used for the insulating layer 36 may be any material as long as it is a normally used material such as enamel material or a resin such as polyimide resin or amide-imide resin. Also, the method for coating the wire assembly 34 may be any method as long as it is a method that is normally used as an insulation coating method such as immersion, electrodeposition coating, oxide filming, or plating.

Figure 4:
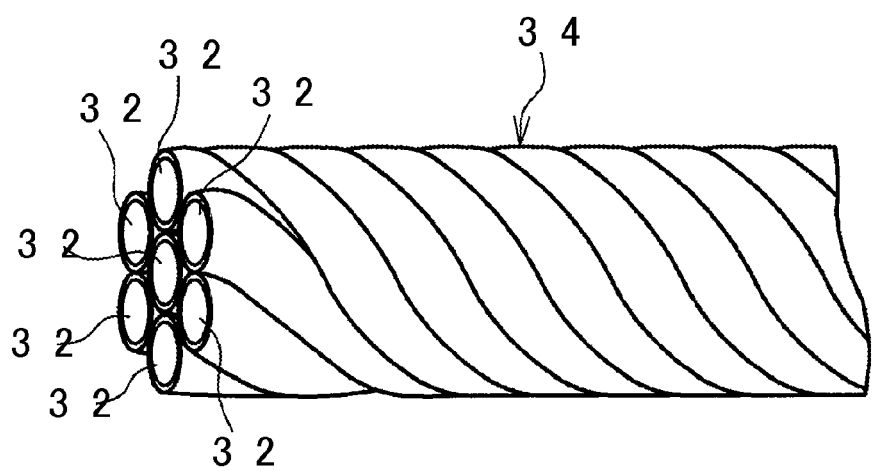
FIG. 4 is a view illustrating the manner in which a bundled wire assembly that forms an assembly conducting wire is twisted.
Figure 5:
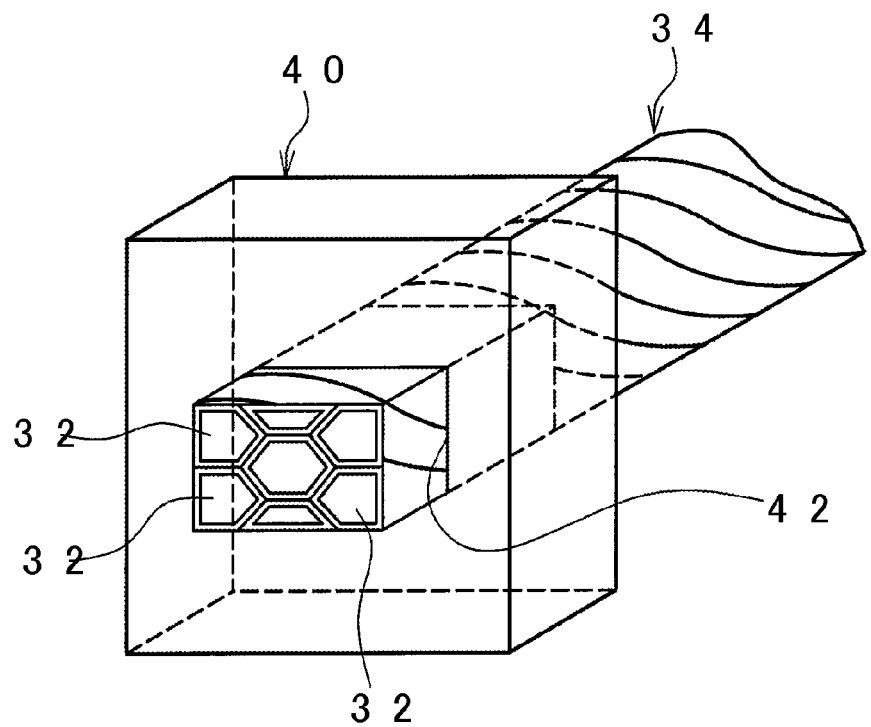
FIG. 5 is a view illustrating the manner in which the twisted wire assembly is formed into a rectangular cross-section by being passed through a die.
Figure 6:
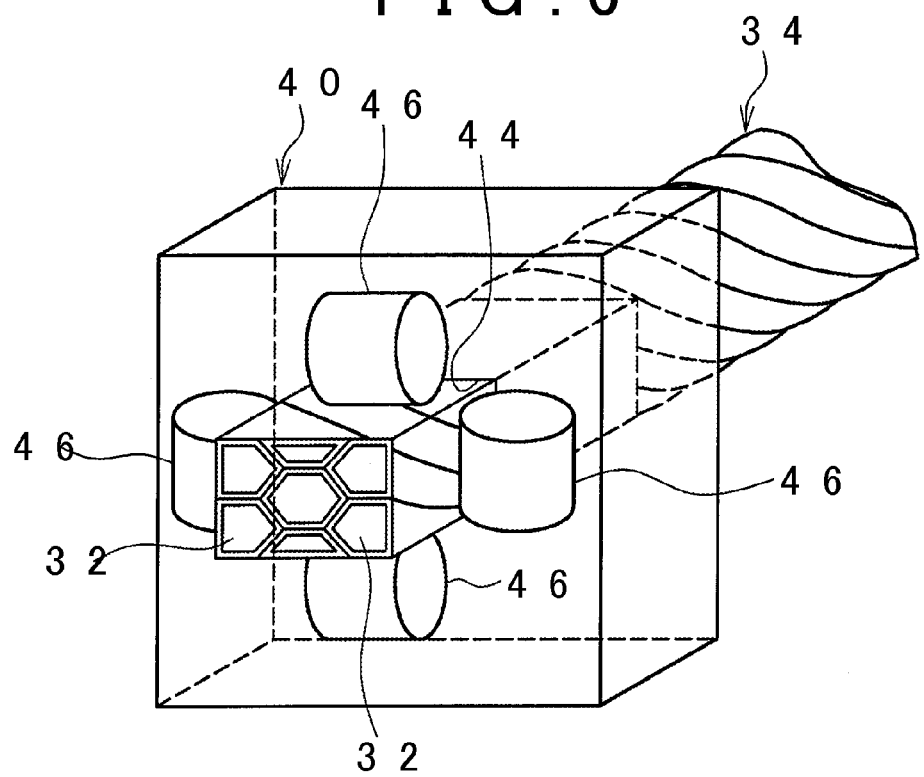
FIG. 6 is a view illustrating the manner in which the twisted wire assembly is formed into a rectangular cross-section by being press-formed from four sides with rollers.

The wire assembly 34 of the assembly conducting wire 30 is formed by twisting together a plurality of the wires 32, each of which is insulation coated, and then compression forming the wire assembly 34 in this state such that it has a rectangular cross-section using a forming die, as shown in FIGS. 4 to 6. Forming the wire assembly 34 by twisting together the wires 32 and compression forming them in this way enables the plurality of wires 32 to be integrated together.

Any method may be used for the compression forming as long as the cross-section of the wire assembly 34 is compression formed into a predetermined shape. For example, as shown in FIG. 5, a drawing process such as die drawing using a forming die 40 that has a square die hole 42 may be employed. Using this kind of drawing process, the cross-section of the wire assembly 34 is easily able to be compression formed into the shape of the die, hole 42 by passing the wire assembly 34 through the die hole 42, regardless of the sectional shape of the wire assembly 34.

Also, as shown in FIG. 6, groove rolling using a hole 44 and rollers 46 may also be employed. Using this kind of groove rolling, the cross-section of the wire assembly 34 is easily able to be compression formed into the shape of the hole 44 by passing the wire assembly 34 through the hole 44, regardless of the sectional shape of the wire assembly 34. As a result, the manufacturing process is able to be simplified, so the assembly conducting wire 30 is able be manufactured efficiently. In this case, the compression forming is performed mainly with the rollers 46, so the wires 32 that form the wire assembly 34 will not rub hard against the inner peripheral surface of the hole 44, so the insulation coating of each of the wires 32 will not easily be damaged.

The sectional shape of the wire assembly 34 after compression forming may be any shape, such as round, square, or hexagonal or the like, but rectangular or polygonal is preferably because the wire assembly 34 will be used as the coil 22. Making the sectional shape of the wire assembly 34 rectangular or polygonal in this way enables adjacent assembly conducting wires 30 to be in surface contact with each other when the assembly conducting wires 30 are arranged in the slot 26. As a result, no gaps will form between adjacent assembly conducting wires 30, so the heat dissipation property and space factor of the coil 22 are able to be improved.

Figure 7:
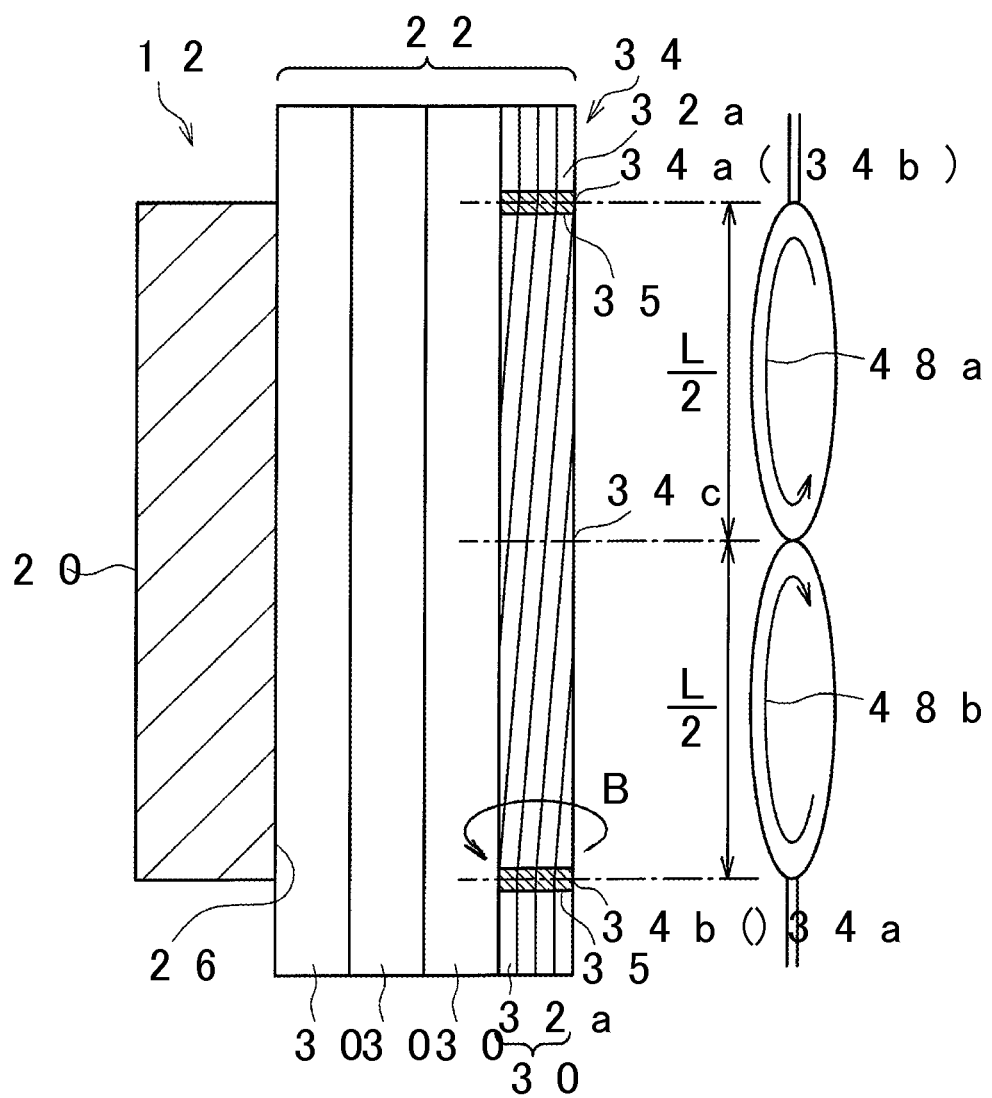
FIG. 7 is a view illustrating the manner in which a twisting starting point portion, a twisting center point, and a phase dislocation portion of the assembly conducting wire arranged in a slot are arranged positioned inside the slot, and the manner in which the flow direction of a circulating current reverses at the twisting center point.

Next, the twisting method and welding of the assembly conducting wire 30 of the example embodiment will be described with reference to FIGS. 7 to 9, in addition to FIG. 3. FIG. 7 is a view illustrating the manner in which a twisting starting point portion, a twisting center point, and a phase dislocation portion of the assembly conducting wire arranged in a slot are arranged positioned inside the slot, and the manner in which the flow direction of a circulating current reverses at the twisting center point. In FIG. 7, the stator axial direction is the vertical direction of the paper on which FIG. 7 is drawn (i.e., a direction orthogonal to the surface of the paper on which FIG. 7 is drawn), and the assembly conducting wire 30 positioned on the radially innermost side in the slot 26 is shown as a wire assembly 34 without the insulating layer 36.

As shown in FIGS. 3 and 7, the coil 22 is formed by a plurality of assembly conducting wires 30 arranged inside the slot 26. Each assembly conducting wire 30 is formed by a wire assembly 34 that is made up of a plurality of twisted and formed wires 32 that are bundled together as described above. The coil 22 is wound around the teeth 24, with the plurality of wire assemblies 34 that pass through the slot 26 in the axial direction being stacked on top of one another in the radial direction (i.e., the direction in which the teeth protrude). In FIG. 3, the slots 26 and the coil 22 are only partially shown in the circumferential direction, but the structure of the portion that is not shown may be realized by the same structure as that of the portion that is shown.

Each assembly conducting wire 30 is electrically connected outside of the slot 26. In this way, a coil turn that is arranged in each slot 26 is formed with the assembly conducting wires 30 as the unit. Also, one assembly conducting wire 30 is formed as the component for each coil turn, and the coil turns are joined together by welding or the like, for example. In the example shown in FIG. 3, the assembly conducting wires 30 are arranged lined up in four layers in the radial direction. In the example shown in FIGS. 3 and 7, four layers of assembly conducting wires 30 are lined up in the radial direction, but the number of the assembly conducting wires 30 that are lined up in the radial direction may be set as appropriate. Also, the coil 22 does not necessarily have to be formed by the assembly conducting wires 30 outside of the slot 26.

In this example embodiment, as shown in FIG. 7, the wire assembly 34 of each assembly conducting wire 30 has a twisting starting point portion 34a in a position corresponding to one end portion in the axial direction of the teeth 24 (or the stator core 20), and has a phase dislocation portion 34b in a position corresponding to the other end portion in the axial direction of the teeth 24. In the wire assembly 34, the wires 32 are twisted in the direction of arrow B, and the position of each wire 32 moves to a 180 degree symmetrical position at the phase dislocation portion 34b with respect to the twisting starting point portion 34a around a center axis that extends in a longitudinal direction of the assembly conducting wire 30. More specifically, a wire 32a positioned on the radially innermost side at the twisting starting point portion 34a is positioned on the radially outermost side at the phase dislocation portion 34b due to being twisted in the circumferential direction of the assembly conducting wire 30, as shown in FIG. 7.

When an axial length of the slot 26 (hereinafter referred to as "slot length") is L, a distance between the twisting starting point portion 34a and the phase dislocation portion 34b of the wire assembly 34 substantially corresponds to the slot length L. Also, the wire assembly 34 has a twisting center point 34c at a position a distance L/2 approximately half the slot length L from both the twisting starting point portion 34a and the phase dislocation portion 34b. At this twisting center point 34c, a phase of each wire 32 is offset in the direction of arrow B by approximately 90 degrees from the twisting starting point portion 34a, and the phase of each wire 32 at the phase dislocation portion 34b is offset in the direction of arrow B by another approximately 90 degrees with respect the twisting center point 34c. In this case, the distance between the twisting starting point portion 34a and the twisting center point 34c is preferably equal to the distance between the phase dislocation portion 34b and the twisting center point 34c, but even if they are not the same, it is still expected that loss due to circulating current will be reduced by cancelling out part of the eddy current.

Also, with the assembly conducting wires 30 in this example embodiment, the wires 32 are welded together at the phase dislocation portion 34b of the wire assembly 34. In FIG. 7, this weld 35 is indicated as a zone with hatching. At this weld 35, the wires 32 of the wire assembly 34 are shorted. The phase dislocation portion 34b is preferably welded in this way after the wires 32 have been bundled and twisted, but before compression forming is performed, though it (i.e., the phase dislocation portion 34b) may also be welded after compression forming is performed.

Further, in the example shown in FIG. 7, the weld 35 is also formed at the twisting starting point portion 34a in addition to the phase dislocation portion 34b. Here, when the phase dislocation portion 34b is viewed as the twisting starting point portion of the wire assembly 34, the twisting starting point portion 34a may be said to correspond to the phase dislocation portion. Therefore, the weld 35 of the twisting starting point portion 34a may also be a weld of the phase dislocation portion.

In FIG. 7, the structure of the wires 32 is shown for only the assembly conducting wire 30 on the radially innermost side (closest to the rotor 14), but the structure of the wires 32 in the other assembly conducting wires 30 that are not shown may be realized by the same structure as that of the portion that is shown.

In this way, each assembly conducting wire 30 is twisted inside the slot 26, such that the arrangement of each wire 32 is dislocated to a 180 degree symmetrical position one time inside the slot 26. However, the arrangement of the wires 32 may be dislocated (phase-inverted) inside the same coil turn (assembly conducting wire 30), but does not have to be dislocated (phase-inverted) between different coil turns (assembly conducting wires 30). Also, the arrangement of the wires 32 may be dislocated only inside the slot 26, but does not have to be dislocated outside the slot 26.

With the rotary electric machine 10, the teeth 24 are magnetized in order by flowing alternating current through the coil 22 of a plurality of phases, such that a rotating magnetic field that rotates in the circumferential direction is formed in the stator 12. Also, electromagnetic interaction (attraction and repulsion) between the rotating magnetic field generated in the stator 12 and a field flux generated by the permanent magnets 18 of the rotor 14 applies torque (magnetic torque) to the rotor 14, which enables the rotor 14 to be rotatably driven. In this way, the rotary electric machine 10 is able to be made to function as an electric motor that has the rotor 14 generate power using electric power supplied to the coil 22.

On the other hand, the rotary electric machine 10 is also able to be made to function as a generator that has the coil 22 generate electric power using the power of the rotor 14. Also, the rotor 14 is not limited to a structure provided with the permanent magnets 18. For example, the rotor 14 may also have a structure provided with a coil, or a structure that uses reluctance torque from a change in magnetic resistance.

When applying torque between the stator 12 and the rotor 14, magnetic flux acts between the stator 12 and the rotor 14, and this magnetic flux flows through the teeth 24 in the radial direction. However, when the magnetic flux that flows through the teeth 24 becomes saturated, magnetic flux leaks out from the teeth 24 and flows out between adjacent teeth 24 (i.e., through the slot 26) in the circumferential direction. In particular, when the torque of the rotor 14 is large, magnetic flux that flows through the teeth 24 tends to become saturated, so magnetic flux tends to flow between the teeth 24 in the circumferential direction. This leakage flux between the teeth 24 passes through the assembly conducting wire 30 (the wires 32) in the circumferential direction. Also, when the leakage flux that flows through the assembly conducting wires 30 between the teeth 24 fluctuates, an eddy current is generated in each of the wires 32. As a result, a circulating current is generated in the assembly conducting wires 30, and consequently, loss from this circulating current occurs.

In contrast, in this example embodiment, the assembly conducting wires 30 are twisted in the slot 26, and the arrangements of the wires 32 are dislocated in different positions within the slot 26. As a result, the direction of the eddy currents that are generated in the wires 32 also simultaneously changes due to a fluctuation in the leakage flux between the teeth 24, and the eddy currents will cancel themselves out considering the entire axial direction inside of the slot 26. For example, as shown in FIG. 7, the direction of an eddy current 48a that flows through the wire 32a between the twisting starting point portion 34a that corresponds to one end of the teeth 24 and the twisting center point 34c, and the direction of an eddy current 48b that flows through the wire 32a between the twisting center point 34c and the phase dislocation portion 34b are reversed, so they cancel each other out. This also applies to the other wires 32 that form the wire assembly 34 of the assembly conducting wire 30. As a result, it is possible to inhibit a circulating current due to an eddy current from being generated in the assembly conducting wires 30, and thus possible to inhibit loss from a circulating current.

Further, with each assembly conducting wire 30 of this example embodiment, the wires 32 are welded together at the phase dislocation portion 34b. When the assembly conducting wire 30 is formed as the coil 22 by being bent outside of the slot 26, the wires 32 are prevented or inhibited from coming apart by being welded at the phase dislocation portion 34b (and 34a). As a result, the outermost insulating layer 36 of the assembly conducting wire 30 will not be broken through by wires 32 that have come apart, so the insulation property will not decrease.

In the description above, both the twisting starting point portion 34a and the phase dislocation portion 34b are welded, but the invention is not limited to this. That is, the structure may also be such that only one of the two is welded. For example, of the twisting starting point portion 34a and the phase dislocation portion 34b, only the side where the bending curvature outside the slot 26 is the largest may be welded.

Figure 8A:
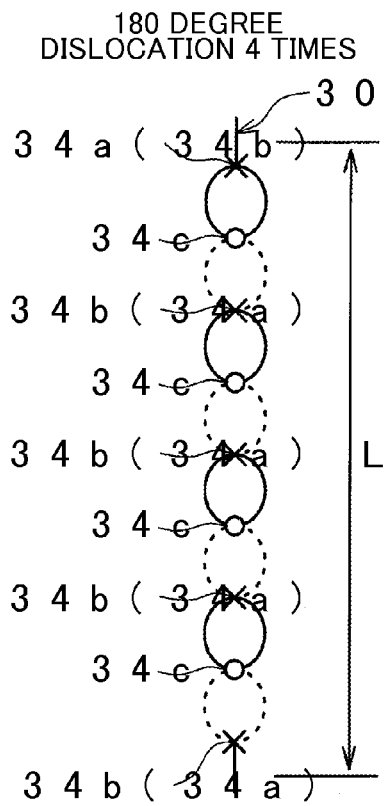
FIG. 8A is a view of an example in which 4 (four) pairs of twisting starting point portions and phase dislocation portions, one pair consisting of one twisting starting point portion and one phase dislocation portion, are provided within a slot length.
Figure 8B:
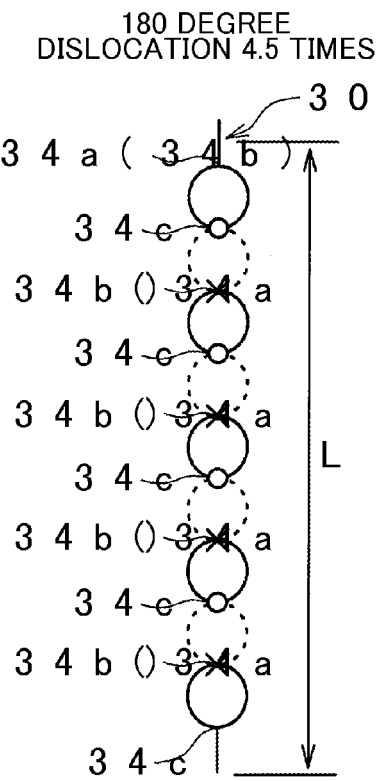
FIG. 8B is a view of an example in which 4.5 (four and a half) pairs of twisting starting point portions and phase dislocation portions are provided within a slot length.

FIG. 8A is a view of an example in which 4 (four) pairs of the twisting starting point portions 34a and the phase dislocation portions 34b, one pair consisting of one twisting starting point portion 34a and one phase dislocation portion 34b, are provided within the slot length L, and FIG. 8B is a view of an example in which 4.5 (four and a half) pairs of twisting starting point portions 34a and phase dislocation portions 34b are provided within the slot length L. In FIGS. 8A and 8B, the welded phase dislocation portion 34b is indicated by an X symbol and the twisting center point 34c that is the boundary at which the flow direction of the eddy current reverses is indicated by an O symbol.

With the assembly conducting wire 30 shown in FIG. 8A, four pairs of the twisting starting point portion 34a and the phase dislocation portion 34b are provided within the slot length L. When a plurality of pairs of the twisting starting point portion 34a and the phase dislocation portion 34b are provided in this way, the phase dislocation portion 34b of the first pair corresponds to the twisting starting point portion 34a of the next pair. Here, a phase dislocation angle of the wire 32 at the phase dislocation portion 34b with reference to the twisting starting point portion 34a may be expressed by 180 degrees×N (where N is an integer).

In this way, loss due to a circulating current is able to be suppressed by providing the plurality of pairs of the twisting starting point portion 34a and the phase dislocation portion 34b in the assembly conducting wire 30 inside the slot 26, and the wires 32 are able to be inhibited from coming apart by being welding at the phase dislocation portion 34b. Also, a closed loop of current that circulates through the wires 32 becomes smaller, so loss due to a circulating current is able to be more effectively suppressed. Here, the wires 32 short due to being welded at the phase dislocation portion 34b, but the flow direction of the eddy current reverses on both sides in the axial direction of the phase dislocation portion 34b (or becomes a portion where an eddy current is not generated), so the closed loop will not become longer due to the weld 35, and thus loss due to a circulating current will not be increased.

With the assembly conducting wire 30 shown in FIG. 8B, 4.5 (four and a half) pairs of the twisting starting point portion 34a and the phase dislocation portion 34b are provided within the slot length L. Even if the number of pairs of the twisting starting point portion 34a and the phase dislocation portion 34b is not an integral multiple in this way, an eddy current cancellation effect is still expected by the wire 32 between the twisting starting point portion 34a and the twisting center point 34c, and the wire between the twisting center point 34c and the phase dislocation portion 34b, so loss due to a circulating current is able to be suppressed.

As shown in FIGS. 8A and 8B, when the phase dislocation portion 34b is in a plurality of locations in the assembly conducting wire 30, welding may be performed at every other phase dislocation portion 34b. Accordingly, every other phase dislocation portion 34b in which the phase of each wire 32 has changed 360 degrees will be welded, so the welding points will be fewer, thus making manufacturing easier, which is advantageous. Alternatively, only either the phase dislocation portion 34b or the twisting center point 34c that is positioned close to the axial end portion of the slot 26 may be welded. This is because this kind of portion is a location where there is a particular tendency for the wires 32 to come apart when bending the assembly conducting wire 30 to form the coil.

Figure 9:
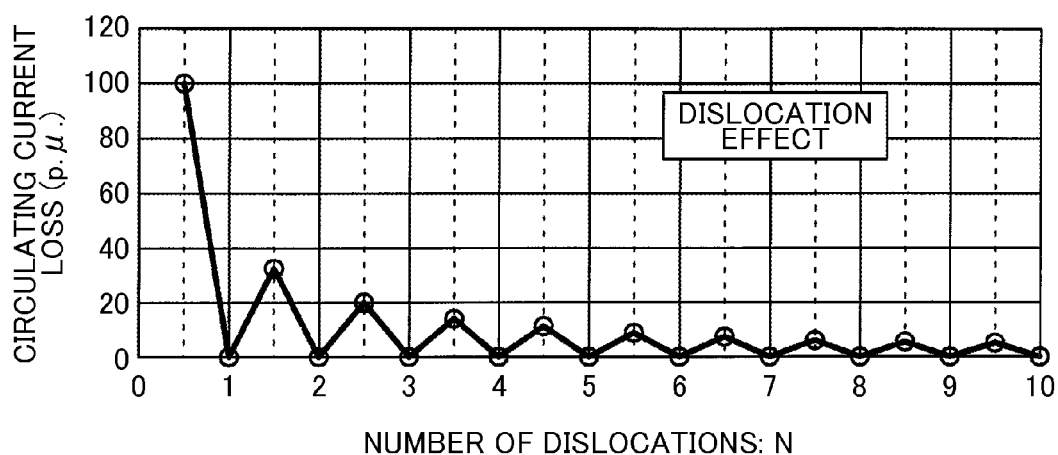
FIG. 9 is a graph showing the relationship between the number of dislocations of the assembly conducting wire in the slot and circulating current loss.

FIG. 9 is a graph showing the relationship between the number of dislocations of the assembly conducting wire in the slot and circulating current loss. In FIG. 9, the horizontal axis represents the number of dislocations (N) and the vertical axis represents the circulating current loss (p.µ.). As shown in the drawing, it is evident that when the number of 180 degree dislocations is an integral multiple, the circulating current of the assembly conducting wire 30 is zero. Also, even if the number of dislocations is not an integral multiple, such as 4.5 as shown in FIG. 8B, for example, the closed loop through which a circulating current flows becomes smaller as the number of dislocations in the slot 26 becomes larger, so the circulating current loss also becomes smaller according to this.

The assembly conductive wire for a rotary electric machine winding according to the invention is not limited to the example embodiments or modified examples thereof, but may be improved or modified in any of a variety of ways within the scope and meanings equivalent to the scope of the claims for patent.

For example, the arrangement of the wires 32 does not necessarily have to be phase inverted in the slot 26 for all of the assembly conducting wires 30 that are lined up in the radial direction. For example, the arrangement of the wires 32 may be twisted and dislocated between the teeth 24 only for the assembly conducting wire 30 on the radially inner side (i.e., on the tip end side of the teeth) where the distance to the rotor 14 is close, and the arrangement of the wires 32 may not be twisted between the teeth 24 for the assembly conducting wire 30 on the radially outer side (i.e., the root side of the teeth) that is farther away from the rotor 14.

Also, in the description above, the twisting starting point portion 34*a* and the phase dislocation portion 34*b* positioned on the end portion in the axial direction of the wire assembly of the assembly conductive wire are positioned inside of the slot 26, but they may also be positioned outside of the slot 26.

Also, in the description above, a case is described in which the coil 22 is wound around the teeth 24 in a distributed winding, but the coil 22 may also be wound around the teeth 24 by a winding method other than a distributed winding. For example, the coil 22 may also be wound around the teeth 24 in a concentrated winding.

Also, in the description above, a case in which the assembly conducting wire is applied to a stator coil is described, but the assembly conducting wire may also be applied to a coil wound around a rotor.

Further, in the description above, a case in which the invention is applied to a radial type rotary electric machine is described, but the invention may also be applied to an axial type rotary electric machine.

What is claimed is:

1. An assembly conducting wire for a motor winding, the assembly conducting wire being formed by a plurality of wires bundled together, the assembly conducting wire including a phase dislocation portion at which a position of each of the wires is a 180 degree symmetrical position with respect to a twisting starting point portion around a center axis that extends in a longitudinal direction of the assembly conducting wire, the position of each of the wires being moved to the 180 degree symmetrical position by twisting a bundled wire assembly in a circumferential direction of the assembly conducting wire, the plurality of wires being welded together at the phase dislocation portion.

2. The assembly conducting wire for a motor winding according to claim 1, wherein the assembly conducting wire is wound around a stator or a rotor as a motor winding, and wherein at least one pair of the twisting starting point portion and the phase dislocation portion is provided within a slot of a stator core or a rotor core.

3. The assembly conducting wire for a motor winding according to claim 2, wherein welding is performed at every other phase dislocation portion.

4. The assembly conducting wire for a motor winding according to claim 1, wherein welding is performed at every other phase dislocation portion.

* * * * *